United States Patent [19]
Filetto et al.

[11] Patent Number: 6,025,842
[45] Date of Patent: Feb. 15, 2000

[54] SYSTEM AND METHOD FOR WINDOW QUEUES AND WHITE SPACE ACTIVATION FOR TOGGLING WINDOWS

[75] Inventors: Thomas Michael Filetto, Endicott; Gilford Francis Martino, Endwell; Frank John Robyck, Endicott; Vincent Thomas Timon, III, Binghamton, all of N.Y.

[73] Assignee: International Business Machines Corporation, Armonk, N.Y.

[21] Appl. No.: 08/964,290

[22] Filed: Nov. 4, 1997

[51] Int. Cl.⁷ ........................................................ G06F 3/00
[52] U.S. Cl. ............................................................... 345/345
[58] Field of Search ................................... 345/326–358, 345/145, 146

[56] References Cited

U.S. PATENT DOCUMENTS

| | | | |
|---|---|---|---|
| 4,862,389 | 8/1989 | Takagi | 364/521 |
| 5,046,001 | 9/1991 | Barker et al. | 364/200 |
| 5,252,951 | 10/1993 | Tannenbaum et al. | 345/358 |
| 5,377,317 | 12/1994 | Bates et al. | 345/342 |
| 5,412,776 | 5/1995 | Bloomfield et al. | 345/340 |
| 5,430,839 | 7/1995 | Jagannathan et al. | 395/159 |
| 5,519,827 | 5/1996 | Mizushima | 395/161 |
| 5,621,880 | 4/1997 | Johnson | 395/326 |
| 5,668,962 | 9/1997 | Kitami | 345/340 |
| 5,742,285 | 4/1998 | Ueda | 345/342 |
| 5,835,088 | 11/1998 | Jaaskelainen, Jr. | 345/343 |
| 5,893,063 | 4/1999 | Loats et al. | 345/340 X |

*Primary Examiner*—John E. Breene
*Attorney, Agent, or Firm*—Shelley M Beckstrand

[57] ABSTRACT

Rapid toggling of application windows to the forefront of a computer monitor. One or more queues are established by a user comprising indicia representative of a sequence of a plurality of open application windows. Sequencial toggling among the windows of a given sequence is accomplished by actuating a mouse pointer positioned to the white space of any window within the given sequence.

12 Claims, 4 Drawing Sheets

SYSTEM AND METHOD FOR WINDOW QUEUES AND WHITE SPACE ACTIVATION FOR TOGGLING WINDOWS

BACKGROUND OF THE INVENTION

1. Technical Field of the Invention

This invention pertains to queueing application windows. More particularly, it pertains to rapid toggling of application windows to the forefront of a computer monitor.

2. Background Art

Users of computers typically run several window applications at the same time, and need to go from one window to another. This is fine when both windows are visible, but when a window is obscured either partially or entirely by another window, it is more difficult to find and move control to the obscured window. The process of changing control involves moving the mouse to the desired window and clicking on the window to bring it to the forefront and give it control It is sometimes required that one or more windows be moved, minimized, or enlarged before the desired window is brought into view to accept the mouse and respond to a click. This takes time and may take several mouse movements.

Different application suites and operating systems require different mouse button clicks and locations to click. For example, a window may require that the mouse be positioned on a specific area of the window in order for a single left button click to bring it to the forefront, and some don't.

There is, therefore, a need in the art for a system and method for bringing a desired window to the forefront of a monitor display without requiring that the mouse be physically moved to the desired window.

SUMMARY OF THE INVENTION

In accordance with the method of the invention, at least one sequence of windows is established and a next window within that sequence brought to the forefront by activating a mouse positioned on the white space of any window in that sequence.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the invention, a system and method is provided which brings a desired window to the forefront of a computer monitor more rapidly.

Figure 1:
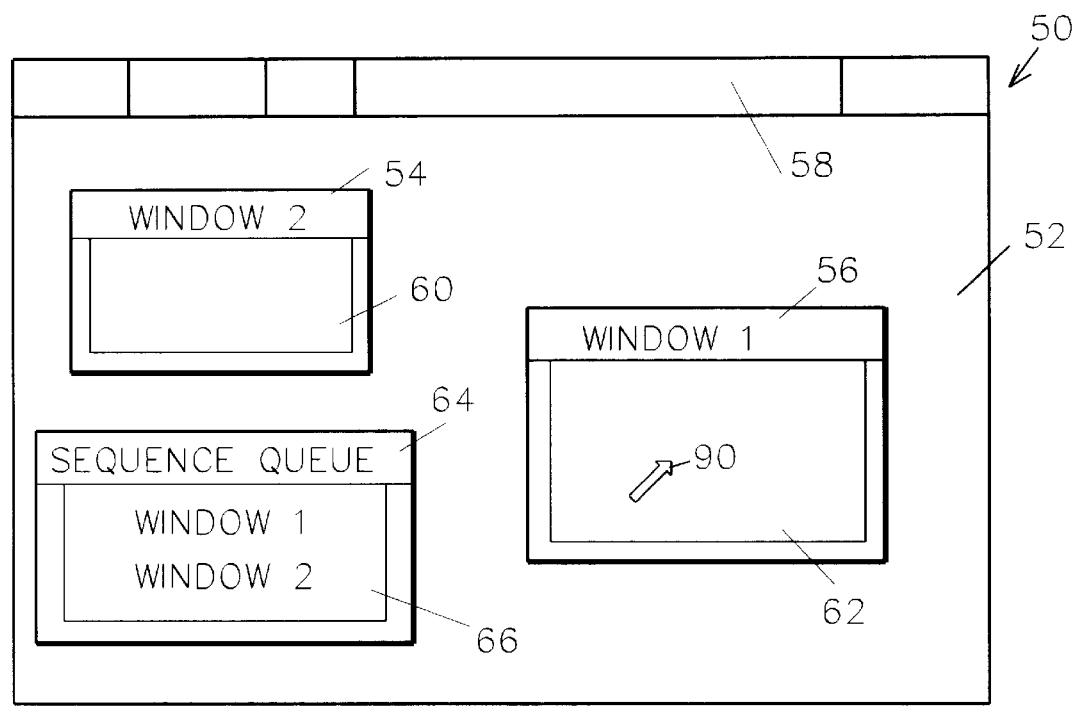
FIG. 1 illustrates a monitor display having two windows and a cursor.

Referring to FIG. 1, computer monitor 50 presents to a user a display area 52 including windows 54 and 56. Window 56 has white space 62 in which cursor 90 is positioned. Window 54 has white space 60.

In accordance with an examplary embodiment, to initialize the system, the application running in window 56 may present an application window 64 allowing the user to add to a sequence queue in white space 66 indicia identifying the order of sequence of windows 54, 56. Window 64 may then be deleted or minimized, leaving only windows 54 and 56 open in display area 52. Open windows may appear in display area 52, or may be minimized. In the latter case, when control is toggled in sequence to a minimized window, such minimized window may be enlarged and displayed in display area 52.

Thereafter, by double clicking a left mouse button in either white space 60 or 62, the user toggles control between windows 54 and 56. In accordance with a preferred embodiment, cursor (or mouse pointer) 90 remains in one place in the forefront of window 56. Alternatively, the cursor moves to the forefront (white space) of the window with control. Similarly, in a two window scenario with one of the windows partially or completely obscured, when a window comes to the forefront the object stays in the same physical location in monitor screen 52, only in the white space of the window in the forefront. It is not necessary, in any of these situations, for the user to move the mouse pointer 90 to the white space of a particular window and then click or double click for that particular window to have control (thus allowing the user to immediately begin keyboard entry in the window with control, even if the mouse pointer is not or has not been moved to it.) In accordance with yet another examplary embodiment, a control key or key combination entered at the keyboard may substitute for the mouse button. And, of course, a user may configure the mouse so as to operate in the above manner with the left, right or middle button. In this examplary embodiment, with only two windows 54 and 56 in display 52 and entered to sequence queue 66, a single click (which restores the previous window in the sequence queue) also serves to toggle control between windows 54 and 56.

Figure 2:
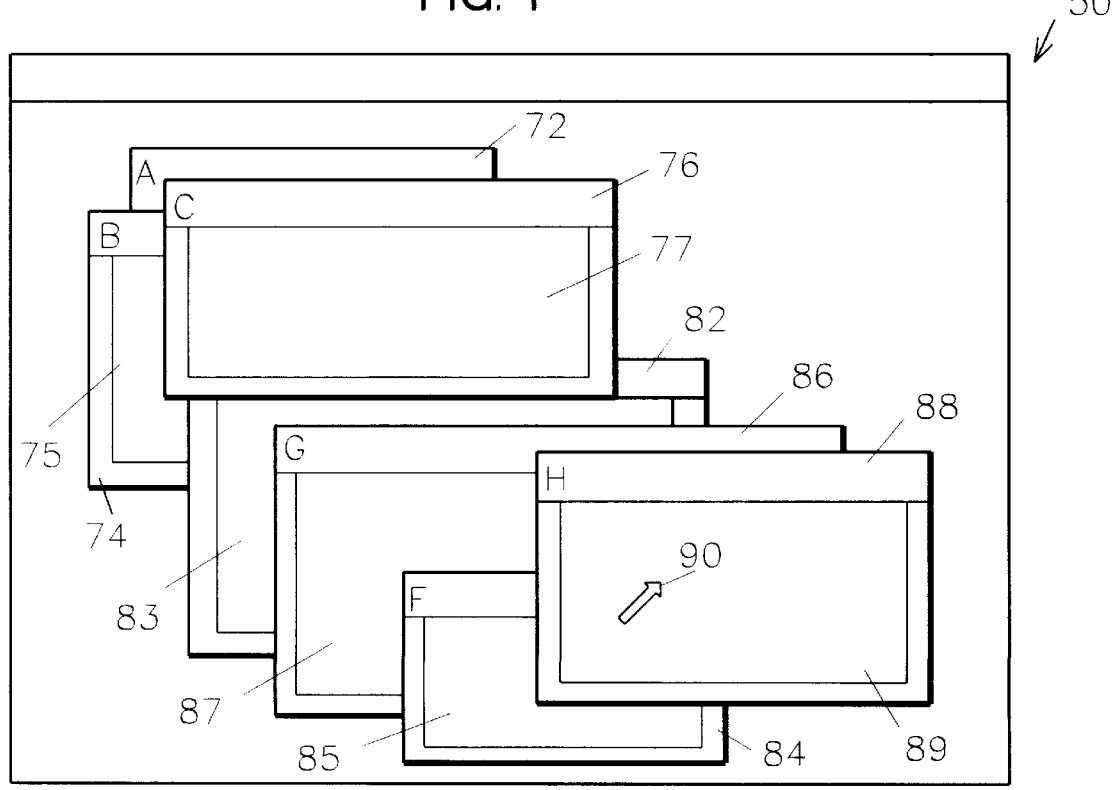
FIG. 2 illustrates the monitor with several windows, some partially or totally obscured by other windows.

Referring to FIG. 2, windows 72, 74, 76, 82, 84, 86 and 88 are illustrated. The white space of window 72 is totally obscured, and the remaining windows include white spaces 75, 77, 83, 85, 87, and 89. Cursor 90 is positioned in white space 89.

Figure 3:
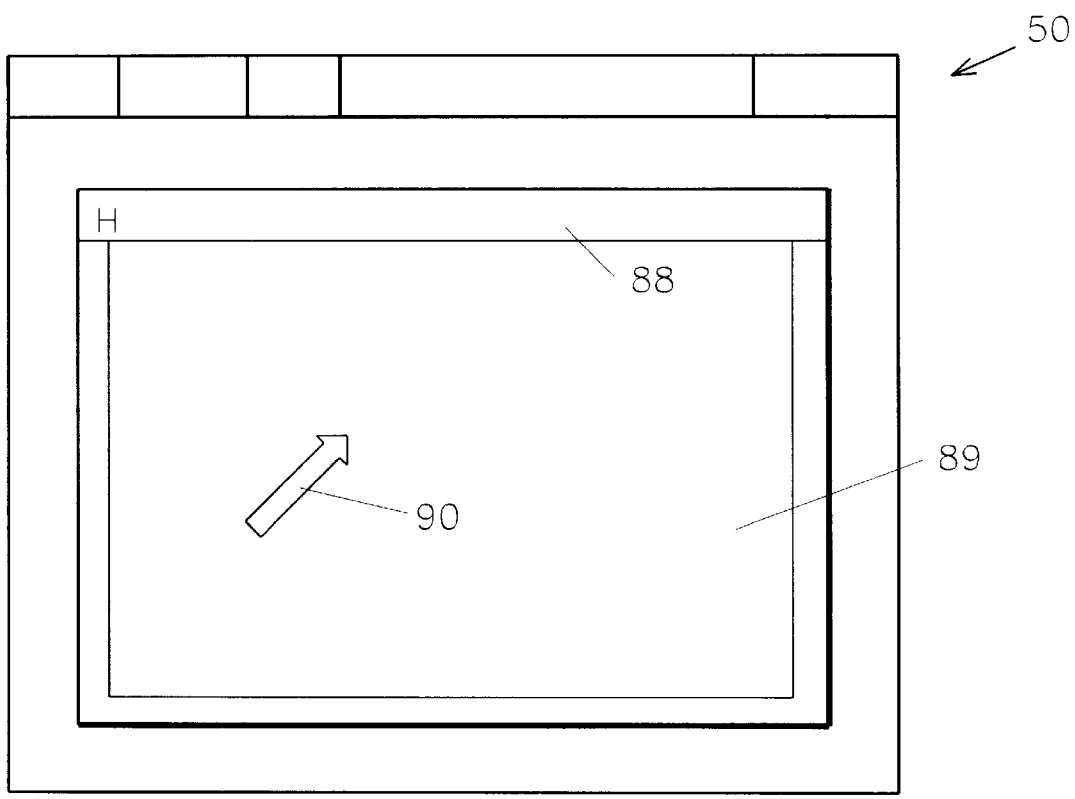
FIG. 3 illustrates the monitor with one window enlarged to occupy the entire screen, thus totally obscuring all other windows.

Referring to FIG. 3, window 88 has been maximized, so as to totally obscure all of the other windows 72, 74, 76, 82, 84 and 86.

Figure 4:
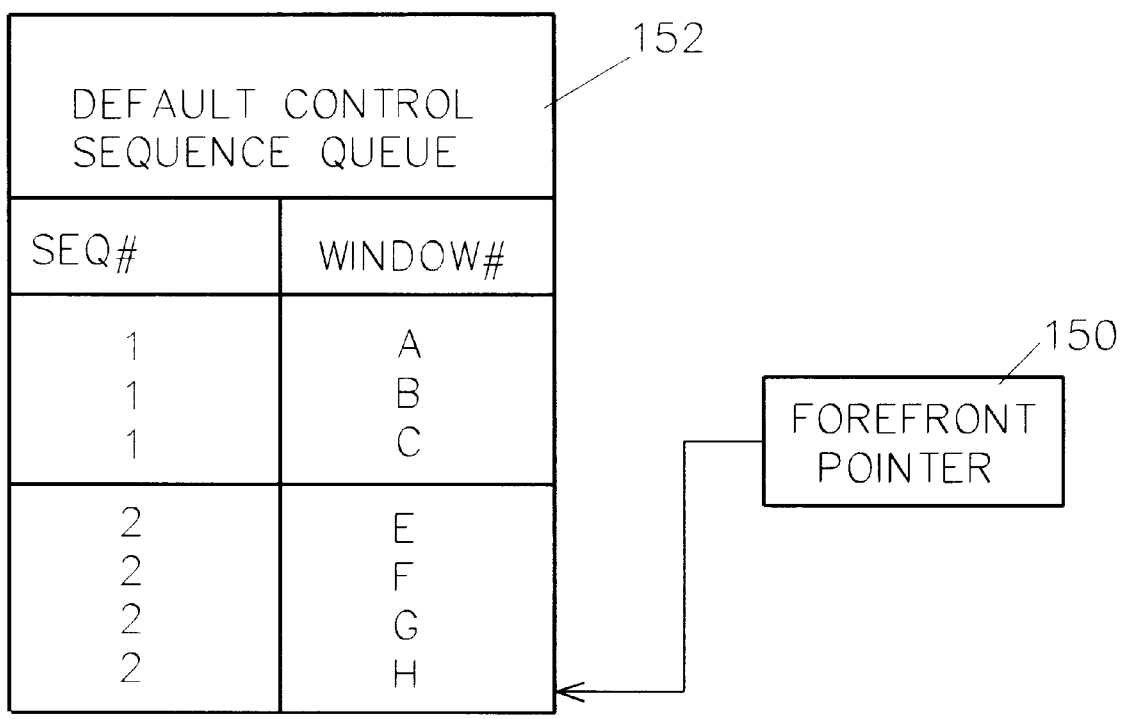
FIG. 4 is a diagram of the default control sequence queue and forefront pointer of the invention.

Referring to FIG. 4, the user has initialized operation (such as by use of sequence queue window 64) so as to establish two sequences. Sequence 1 includes windows A 72, B 74 and C 76 in that order. Sequence 2 includes windows E (not visible) 82, F 84, G 86 and H 88. Forefront pointer 150 points to the entry in queue 152 corresponding to window H 88 in sequence 2, and that window 88 is the forefront, or control window.

The user accesses windows in the order or sequence EFGHEFG . . . by double clicking on the white space of any of windows E 82, F 84, G 86 or H 88. By positioning cursor 90 to the white space of any window 72, 74 or 76 in sequence 2, double clicking will bring windows A 72, B 74 and C 76 to the forefront in the order ABCABC . . . .

Single clicking the mouse control button brings the previous window of a sequence to the forefront. Thus, single clicking in any of white areas 75 or 77, will sequence control among windows A, B and C in the order CBACBA . . . ; and single clicking in any of white areas 83, 85, 87 or 89 will sequence control among windows E, F, G, and H in the order HGFEHG . . . . When a window is thus actuated in sequence, it comes to the forefront of monitor display area 52. If any window coming to the forefront places the mouse pointer in a different window, double clicking in that different window will bring the next window in the control sequence 152 to the forefront of monitor 52.

In accordance with the invention, applications or suites of applications such as Lotus Notes and Microsoft Developers Studio typically have a main application window 88 with many open windows 82, 84, 86 within main application 88.

Figure 5:
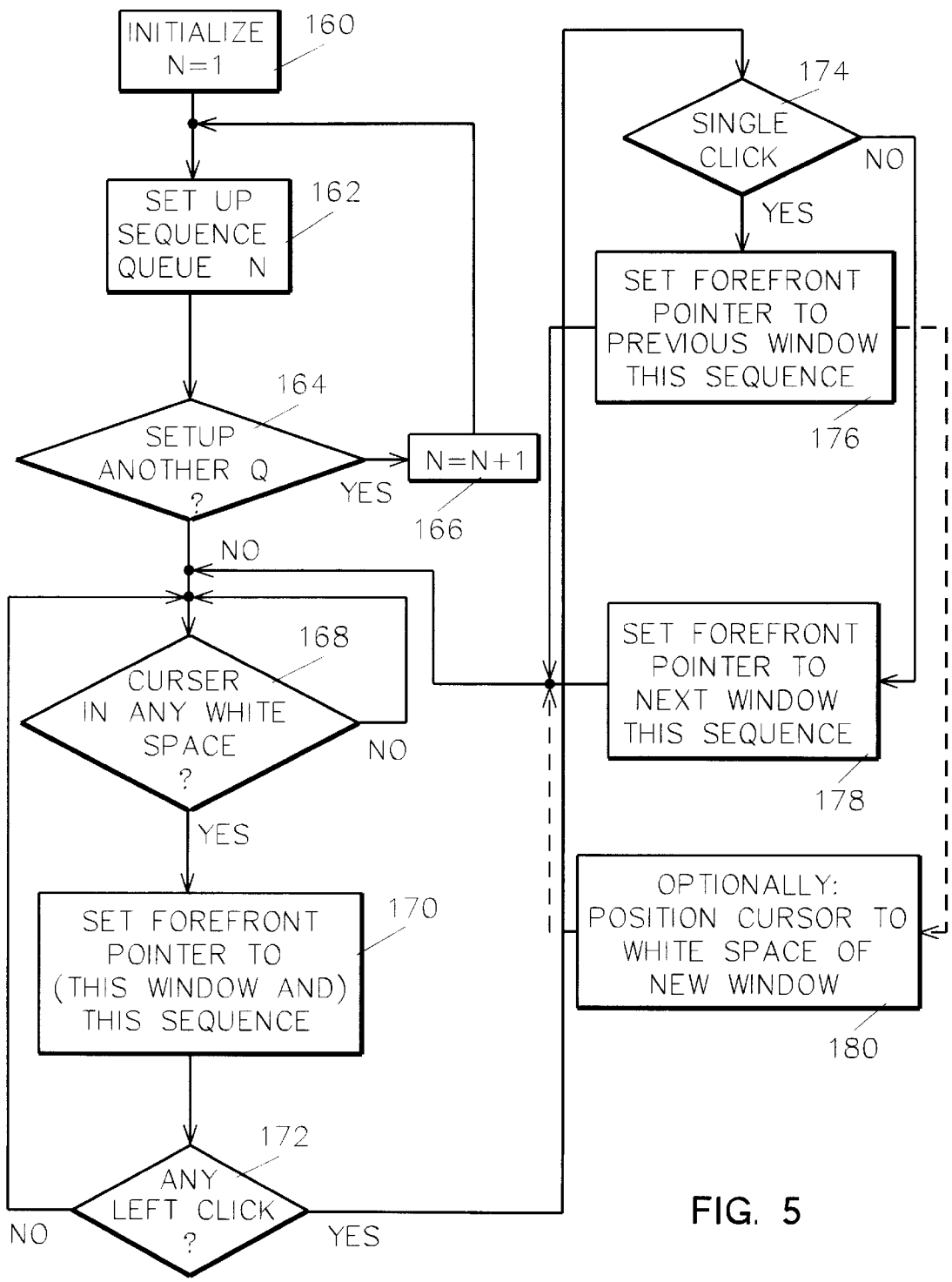
FIG. 5 is a flow diagram of the method of the invention for bringing windows to the forefront in sequence.

Referring to FIG. 5, a flow diagram of an examplary embodiment of the method steps of the invention is illustrated. The method of the invention may be executed under control of code residing in the application program. When used in a modern C++ object oriented environment, the code may reside at the operating system level without requiring changes by the applications. In step 160, the system is initialized to operate, including setting the variable N equal to 1 and displaying window 64. In step 162, the user enters in sequential order indicia identifying the windows to be included in queue 152, and ask for or enable the selection of another sequence (N+1). If so, in steps 164 and 166 control is passed back to step 162 and the user enters the next sequence. In accordance with a modification to steps 162–166, the user may add a window to the sequence of his choice, or to a default sequence. Any number of sequences may be provided.

After entry of sequences to control sequence queues 152, processing waits in step 168 for cursor 90 to be placed in any white space. In step 170, with cursor 90 in a white space of this window, forefront pointer 150 is set to point to the sequence 152 to which this window 88 pertains. Thus, the order of sequence of windows is configured by the user of an application, and windows can be arranged in multiple sequences.

In steps 172 and 174, processing waits for a double or single click of the left mouse button for cursor 90. If a single click, in step 176 forefront pointer 150 is set to previous window G 86 in sequence 152. If a double click, in step 178 forefront pointer 150 is set to next window E 82 in sequence 152. Optionally, in step 180, after forefront pointer 150 is set to a new window, either the preceding or following window, cursor 90 is positioned to the white space of the new window. Thus, navigation among windows does not require any keystrokes as soon as a window is brought to the forefront and made active.

In accordance with further embodiments of the invention, various types of mouse button controls can be actuated by providing a plurality of buttons and/or by single or double clicking, or so forth, to toggle in forward or reverse sequence through the queues of open windows.

Advantages Over the Prior Art

It is an advantage of the invention that a system and method is provided for bringing a desired window to the forefront of a monitor display without requiring that a mouse pointer be physically moved to the desired window.

It is a further advantage of the invention that windows in sequence are brought to the forefront of a monitor display even if hidden without requiring the moving or altering (such as by minimizing or reducing in size) windows covering a desired hidden window.

It is a further advantage of the invention that a user configures the order or sequence of windows, and that windows may be added to a sequence of his choice.

Alternative Embodiments

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

We claim:

1. Method for controlling the operation of a computer monitor, comprising the steps of:

establishing in a queue at least one sequence of a plurality of open windows; and responding to user first type activation of a mouse pointer positioned within the white space of any window of said sequence to bring to the forefront the next window of said sequence.

2. The method of claim 1, comprising the further step of:

responding to user second type activation of said mouse pointer positioned within the white space of any window in said sequence to bring to the forefront the previous window of said sequence.

3. The method of claim 2, wherein said establishing step comprises the steps of:

responding to user input to establish a plurality of sequences and include within each of said sequences one or more window indicia.

4. The method of claim 3, comprising the further steps of:

responding to user activation of a mouse pointer positioned within the white space of a window of a first sequence selectively to position to the forefront a previous or next window of said first sequence; and responding to user activation of a mouse pointer positioned within the white space of a window of a second sequence selectively to position to the forefront a previous or next window of said second sequence.

5. The method of claim 4 wherein said activation is selected from the group consisting of a single click of a mouse button, a double click of said mouse button, at least one click of a first mouse button, and at least one click of a second mouse button.

6. The method of claim 2 wherein said sequence includes a main application window of a suite of applications and a plurality of open windows associated with said main application window.

7. The method of claim 6 wherein said main application window is one of a suite of applications.

8. System for controlling the operation of a computer monitor, comprising the steps of:

means for establishing in a queue at least one sequence of a plurality of open windows; and means responsive to user first type activation of a mouse pointer positioned within the white space of any window of said sequence to bring to the forefront the next window of said sequence.

9. The system of claim 8, further comprising:

means responsive to user second type activation of said mouse pointer positioned within the white space of any window in said sequence to bring to the forefront the previous window of said sequence.

10. A program storage device readable by a machine, tangibly embodying a program of instructions executable by a machine to perform method steps for controlling the operation of a computer monitor, said method steps comprising:

establishing in a queue at least one sequence of a plurality of open windows;

responding to user first type activation of a mouse pointer positioned within the white space of any window of said sequence to bring to the forefront the next window of said sequence; and responding to user second type activation of said mouse pointer positioned within the white space of any window in said sequence to bring to the forefront the previous window of said sequence.

11. An article of manufacture comprising:

a computer usable medium having computer readable program code means embodied therein for controlling the operation of a computer monitor, the computer readable program means in said article of manufacture comprising:

computer readable program code means for causing a computer to establish in a queue at least one sequence of a plurality of open windows;

computer readable program code means for causing a computer to respond to user first type activation of a mouse pointer positioned within the white space of any window of said sequence to bring to the forefront the next window of said sequence; and respond to user second type activation of said mouse pointer positioned within the white space of any window in said sequence to bring to the forefront the previous window of said sequence.

12. Method for controlling a computer monitor, comprising the steps of: establishing at least one sequence of windows, and bringing to the forefront of said monitor a next window within said sequence by activating a mouse positioned on the white space of any window in said sequence.

* * * * *